United States Patent [19]
Bantel et al.

[11] 3,904,659
[45] Sept. 9, 1975

[54] PRODUCTION OF PURE 1-NITROANTHRAQUINONE

[75] Inventors: Karl-Heinz Bantel, Ludwigshafen; Heinz Eilingsfeld, Frankenthal, both of Germany

[73] Assignee: Badische Anilin- & Soda-Fabrik Aktiengesellschaft, Ludwigshafen, Germany

[22] Filed: Oct. 29, 1973

[21] Appl. No.: 410,367

[30] Foreign Application Priority Data
Oct. 31, 1972 Germany..................... 2253276

[52] U.S. Cl. ............................................. 260/369
[51] Int. Cl.² ........................................ C07C 79/37
[58] Field of Search .................................. 260/369

[56] References Cited
UNITED STATES PATENTS
3,766,222   10/1973   Hartwig et al. ..................... 260/369

FOREIGN PATENTS OR APPLICATIONS
2,304,233   8/1973   Germany ............................ 260/369

*Primary Examiner*—Lorraine A. Weinberger
*Assistant Examiner*—E. Jane Skelly
*Attorney, Agent, or Firm*—Johnston, Keil, Thompson & Shurtleff

[57] ABSTRACT

A process for the production of pure 1-nitroanthraquinone from a mixture of nitroanthraquinone by treating the mixture in an organic polar aprotic solvent in the presence of an initiator such as a compound yielding nitrite, halide, thiocyanate, alcoholate or phenolate ions with a compound which has at least one —$CH_2$— group activated by one or more carbonyl groups.

1-nitroanthraquinone which is virtually pure or only contains very small amounts of isomers and dinitroanthraquinones is obtained in good to very good yields by the process of the invention.

6 Claims, No Drawings

PRODUCTION OF PURE 1-NITROANTHRAQUINONE

The present invention relates to a process for the production of pure 1-nitroanthraquinone from nitroanthraquinone mixtures.

In the nitration of anthraquinone a mixture of various nitro compounds is always obtained. Mononitration cannot be carried out uniformly and 1-nitroanthraquinone can only be obtained contaminated with 2-nitroanthraquinone and various dinitro compounds. When nitration is carried out in concentrated sulfuric acid products are obtained as a rule which contain from about 60 to 75 percent of 1-nitroanthraquinone.

Since the tinctorial properties of dyes prepared from derivatives of 1-nitroanthraquinone are often adversely affected by impurities present in the starting material, it is desirable to start from 1-nitroanthraquinone which is as pure as possible.

It is an object of the present invention to obtain pure 1-nitroanthraquine from nitration products of anthraquinone obtained by prior art nitration methods.

We have now found that 1-nitroanthraquinone is obtained from nitroanthraquinone mixtures in a good yield and excellent purity by treating the nitroanthraquinone mixture containing 1-nitroanthraquinone in an aprotic polar organic solvent (which may contain up to 10 percent by weight of water) in the presence of a catalytic amount of an initiator with a compound which has at least one —$CH_2$— group which is activated by one or more carbonyl groups.

Undesirable byproducts from the nitration are converted by this treatment into readily soluble compounds and may therefore by separated from the unreacted 1-nitroanthraquinone. It is surprising that the reaction is limited practically exclusively to the dinitroanthraquinones. Mononitroanthraquinones are attacked to only a very slight extent if at all. When a suitable solvent is used, any small amounts of 2-nitroanthraquinone present in the nitroanthraquinone mixture remain in the mother liquor, so that a very pure 1-nitroanthraquinone can be isolated in a high yield according to this process.

Nitroanthraquinone mixtures which can be subjected to the purification process according to this invention may be mixtures obtainable according to conventional nitration methods and which as a rule contain only up to 75 percent by weight of 1-nitroanthraquinone. Naturally, mixtures having a higher content of 1-nitroanthraquinone may be purified more easily. Suitable initiators to be used according to the invention include compounds yielding nitrite, thiocyanate, iodide, bromide, chloride, fluoride, phenolate or alcoholate ions under the reaction conditions.

Examples of compounds which yield the abovementioned ions as initiators under the reaction conditions are alkali metal nitrites or alkaline earth metal nitrites such as sodium, potassium, magnesium or calcium nitrite, alkali metal thiocyanates such as sodium or potassium thiocyanate, alkali metal halides and alkaline earth metal halides such as sodium, potassium, lithium, magnesium or calcium iodide, sodium, potassium, lithium, magnesium, strontium or calcium bromide, sodium, potassium, lithium, magnesium or calcium chloride, sodium, potassium, lithium, or magnesium fluoride, alkali metal phenolates, alkaline earth metal phenolates, alkali metal alcoholates or alkaline earth metal alcoholates such as sodium, potassium, lithium, magnesium or calcium phenolate, sodium, potassium, magnesium or calcium methylate, ethylate, propylate or butylate or phenol.

The compounds which yield the initiators are added to the reaction mixture in a catalytic amount.

A catalytic amount in the context of the present invention means from 0.1 to 10 percent by weight based on the nitroanthraquinone mixture.

The nitrite ion ($NO_2^{\ominus}$) is particularly preferred as the initiator.

Suitable compounds containing —$CH_2$—groups (which are hereinafter referred to as methylene-active compounds and whose —$CH_2$— group is activated by one or more —CO— groups) are aliphatic, cycloaliphatic, araliphatic and also heterocyclic unsubstituted or substituted ketones, $\beta$-ketocarboxylic esters or amides, $\beta$-carbonyl compounds and cyclic carbonamides. Specific examples of methylene-active compounds are methyl ethyl ketone, diethyl ketone, methyl propyl ketone, ethyl propyl ketone, dipropyl ketone, methyl butyl ketone, ethyl butyl ketone, propyl butyl ketone, dibutyl ketone, isopropyl ethyl ketone, isopropyl propyl ketone, cyclopentanone, cyclohexanone, cyclooctanone, acetylacetone, benzoylacetone, ethyl acetoacetate, acetoacetamides such as the anilide, malonic esters, cyanoacetates, acetophenone, propiophenone and 3-methyl-1-phenylpyrazolone-5.

Liquid methylene-active compounds which are manufactured industrially are preferred for economic and technical reasons.

Methyl ethyl ketone, diethyl ketone, cyclopentanone, cyclohexanone, ethyl aceto-acetate, propiophenone, malonates and mixtures of the same are particularly preferred because of their particularly high activity in the treatment of nitroanthraquinone mixtures. A very pure 1-nitroanthraquinone in which dinitrothraquinone can no longer be detected by thin layer chromatography is obtained by means of the said compounds. 1-aminoathraquinone obtained from such 1-nitroanthraquinone fulfils all the requirements placed on precursors which are to serve for the production of dyes whose tinctorial properties are very sensitive to the presence of impurities.

The amount of methylene-active compound which is necessary for the process according to the invention depends on the type and above all on the amount of the impurities. The optimum amount of methylene-active compound may be determined in a few simple experiments, the treated product being investigated by thin layer chromatography. The amount of methylene-active compound (or mixture of the same) used is generally from 0.3 to 3 moles and preferably from 0.5 to 2 moles per mole of dinitro compounds in the nitroanthraquinone mixture.

In carrying out the process the solvent is as a rule so selected that the desired 1-nitroathraquinone has the lowest possible solubility therein and the products formed by the treatment have the highest possible solubility therein.

It has been found that polar aprotic solvents such as the N-alkylamides or N,N-dialkylamides of carboxylic acids and particularly of propionic acid, acetic acid and very particularly of formic acid and N-methylpyrrolidone as well as dimethylsulfoxide, hexamethylphosphoric triamide or tetramethylurea are particularly suitable for this purpose. These solvents may contain up to 10 percent by weight of water without the purity of the 1-nitroanthraquinone being impaired.

Preferred solvents are N,N-dimethylpropionamide, N,N-dimethylformamide, N-methylformamide, N-methylpyrrolidone, dimethylsulfoxide, hexamethylphosphoric triamide and tetramethylurea.

The amount of solvent used depends particularly on the solubility of the reaction products formed in the treatment with the methylene-active compound. The amount of solvent used is as a rule from about half to about ten times the amount of nitroanthraquinone mixture. When carrying out the process on a commerical scale the amount of solvent used in the process should be kept as small as possible for economic reasons so that a high space-time yield of pure 1-nitroanthraquinone is achieved and the amount of 1-nitroanthraquinone dissolved in the solvent is as small as possible.

The reaction is generally carried out at a temperature of from 40° to 250°C; the preferred temperature range is from 70°to 150°C. When temperatures below 70°C are used the reaction periods are as a rule prolonged and at temperatures above 150°C there is a risk that undesired byproducts may be formed. The process according to the invention is conveniently carried out by heating to the desired reaction temperature a mixture of the nitroanthraquinone mixture, the methylene-active compound and the initiator and the solvent while stirring, and allowing the whole to cool to room temperature after the reaction is over. The pure 1-nitroanthraquinone is separated from the reaction mixture by a conventional method, freed from mother liquor by washing and if desired dried.

The nitroanthraquinone may be used in dry finely ground form or in the form of water-moist material. If it is desired to carry out the treatment in a nonaqueous medium, the adherent water may be removed by washing with a low-boiling watermiscible solvent and, if desired, distilling off the low-boiling solvent from the reaction medium which has a higher boiling point. The moist nitroanthraquinone mixture may also be dried by distilling off the water with the solvent used and then carrying out the treatment in the same solvent.

1-nitroanthraquinone obtained according to the process may be reduced to 1-aminoanthraquinone by conventional methods. Because of its outstanding purity the 1-amino-anthraquinone thus obtained is outstandingly suitable for the production of dyes and dye precursors.

The mother liquor may be worked up by a conventional method so that the conversion products of the dinitroanthraquinone are obtained as a residue. In contrast to the dinitroanthraquinones themselves, the conversion products obtained as a residue can be burnt in conventional incinerators. This consititutes another advantage of the process according to the invention.

The invention is further illustrated by the following Examples in which parts and percentages are by weight.

EXAMPLE 1

50 parts of nitroanthraquinone mixture (which contains about 75 percent of 1-nitroanthraquinone about 3 to 5 percent of 1,5-dinitroanthraquinone, about 10 percent of 1,6-, 1,7- and 2,7-dinitroanthraquinone and some 2-nitroanthraquinone), 50 parts of N,N-dimethylformamide, 7 parts of cyclopentanone and 1 parts of sodium nitrite are stirred for two hours at 130°C. After cooling the whole is suction filtered and the residue is washed with 10 parts of cold N,N-dimethylformamide, then with 20 parts of methanol and finally with water and dried. 28.9 parts of pure 1-nitroanthraquinone is obtained.

To determine purity the isolated 1-nitroanthraquinone is reduced to 1-aminoanthraquinone and the latter is analyzed by thin layer chromatography; (silica gel; developer toluene/ethyl acetate/pyridine 20:2:1 by volume). No other components can be seen in the chromatogram.

EXAMPLE 2

The procedure of Example 1 is followed but 7 parts of cyclooctanone is used instead of 7 parts of cyclopentanone. 31.6 parts of pure 1-nitroanthraquinone is obtained.

EXAMPLE 3

The procedure of Example 1 is followed but 7 parts of diethyl ketone is used instead of 7 parts of cyclopentanone. 33 parts of 1-nitroanthraquinone is obtained which contains traces of 1,5-dinitroanthraquinone.

EXAMPLE 4

The procedure of Example 1 is followed but 7 parts of cyclohexanone is used instead of 7 parts of cyclopentanone. 32.5 parts of pure 1-nitroanthraquinone is obtained.

EXAMPLE 5

The procedure of Example 1 is followed, but 7 parts of propiophenone is used instead of 7 parts of cyclopentanone. 33.7 parts of 1-nitroanthraquinone is obtained which contains a trace of 1,5-dinitroanthraquinone.

EXAMPLE 6

The procedure of Example 1 is followed but 6 parts of ethyl acetoacetate is used instead of 7 parts of cyclopentanone 36.2 parts of 1-nitroanthraquinone is obtained which contains a trace of 1,5-dinitroanthraquinone.

EXAMPLE 7

The procedure of Example 1 is followed but 8 parts of diethyl malonate is used instead of 7 parts of cyclopentanone. 32 parts of 1-nitroanthraquinone is obtained which is contaminated with a trace of 1,5-dinitroanthraquinone.

EXAMPLE 8

The procedure of Example 1 is followed but 7 parts of methyl ethyl ketone is used instead of 7 parts of cyclopentanone. 31 parts of pure 1-nitroanthraquinone is obtained.

EXAMPLE 9

The procedure of Example 1 is followed but 8 parts of acetophenone is used instead of 7 parts of cyclopentanone. 30.5 parts of pure 1-nitroanthraquinone is obtained.

EXAMPLE 10

The procedure of EXAMPLE 1 is followed but 9 parts of 3-methyl-1-phenylpyrazolone-5 is used. 29.8 parts of 1-nitroanthraquinone is obtained which is contaminated with a trace of 1,5-dinitroanthraquinone and 1,8-dinitroanthraquinone.

EXAMPLE 11

The procedure of Example 1 is followed but 9 parts of benzoylacetone is used instead of 7 parts of cyclopentanone. 30.5 parts of 1-nitroanthraquinone is obtained which contains a trace of 1,5-dinitroanthraquinone.

EXAMPLE 12

The procedure of Example 4 is followed but 1.5 parts of sodium thiocyanate is used instead of 1 part of sodium nitrite. 30.5 parts of pure 1-nitroanthraquinone is obtained.

EXAMPLE 13

The procedure of Example 10 is followed but 8 parts of acetylacetone is used instead of methylphenylpyrazolone-5.

The yield is 29.5 parts of 1-nitroanthraquinone which contains a trace of 1,5-dinitroanthraquinone and 1,8-dinitroanthraquinone.

EXAMPLE 14

50 parts of nitroanthraquinone mixture (composition as in Example 1), 50 parts of dimethylsulfoxide, 7 parts of cyclohexanone and 1 part of sodium nitrite are stirred for three hours at 120°C. The product is worked up as in Example 1. The yield is 29.3 parts of pure 1-nitroanthraquinone.

EXAMPLE 15

50 parts of nitroanthraquinone mixture (75 percent of 1-nitroanthraquinone), 50 parts of hexamethylphosphoric triamide, 7 parts of cyclohexanone and 1 part of sodium nitrite are stirred for three hours at 120°C and then worked up. 27.1 parts of pure 1-nitroanthraquinone is obtained.

EXAMPLE 16

50 parts of nitroanthraquinone mixture (75 percent of 1-nitroanthraquinone), 50 parts of tetramethylurea, 7 parts of cyclohexanone and 1 part of sodium nitrite are stirred for three hours at 130°C and worked up as in Example 1. The yield is 31.0 parts of pure 1-nitroanthraquinone.

EXAMPLE 17

50 parts of nitroanthraquinone mixture (75 percent of 1-nitroanthraquinone), 50 parts of N-methylformamide, 7 parts of cyclohexanone and 1 part of sodium nitrite are stirred for three hours at 120°C and worked up as in Example 1. The yield is 31.2 parts of pure 1-nitroanthraquinone.

EXAMPLE 18

55 parts of a nitroanthraquinone mixture of the composition specified in Example 1 and containing 10 percent of water, 60 parts of dimethylformamide, 7 parts of cyclohexanone and 1 part of sodium nitrite are stirred for two hours at 130°C and then worked up. 32.5 parts of pure 1-nitroanthraquinone is obtained.

We claim:

1. A process for the production of pure 1-nitroanthraquinone from a nitroanthraquinone mixture containing at least 60 percent by weight of 1-nitroanthraquinone which comprises treating the mixture in from one-half to ten times the amount of the nitroanthraquinone mixture of an aprotic polar organic solvent which may contain up to 10 percent by weight of water in the presence of from 0.1 to 10 percent by weight based on the nitroanthraquinone mixture of an initiator selected from the group consisting of alkali metal nitrite, alkaline earth metal nitrite, alkali metal thiocyanate, alkali metal and alkaline earth metal halides with 0.5 to 2 moles, per mole dinitro compound in the nitroanthraquinone mixture, of a compound having at least one activated —$CH_2$— group and which is selected from the group consisting of methyl ethyl ketone, diethyl ketone, methyl propyl ketone, ethyl propyl ketone, dipropyl ketone, methyl butyl ketone, ethyl butyl ketone, propyl butyl ketone, dibutyl ketone, isopropyl ethyl ketone, isopropyl propyl ketone, cyclopentanone, cyclohexanone, cyclooctanone, acetylacetone, benzoylacetone, ethyl acetoacetate, acetoacetanilide, diethyl malonate, acetophenone, propiophenone and 3-methyl-1-phenylpyrazolone-5 at a temperature of from 70° to 150°C, cooling the mixture after completion of the reaction and separating the purified 1-nitroanthraquinone from the reaction mixture.

2. A process as set forth in claim 1, wherein the initiator is sodium nitrite, potassium nitrite, magnesium nitrite, calcium nitrite, sodium thiocyanate, potassium thiocyanate, sodium chloride, potassium chloride, lithium chloride, magnesium chloride, calcium chloride, sodium bromide, potassium bromide, lithium bromide, magnesium bromide, strontium bromide, calcium bromide, sodium fluoride, potassium fluoride, lithium fluoride or magnesium fluoride.

3. A process as set forth in claim 1, wherein sodium nitrite, potassium nitrite, magnesium nitrite or calcium nitrite is used as the initiator.

4. A process as set forth in claim 1, wherein methyl ethyl ketone, diethyl ketone, cyclopentanone, cyclohexanone, cyclooctanone, acetylacetone, benzoylacetone, ethyl acetoacetate, ethyl malonate, acetophenone, propiophenone, or 3methyl-1-phenylpyrazolone-5 is used as the compound having an activated —$CH_2$— group.

5. A process as set forth in claim 1, wherein N,N-dimethyl-formamide, N-methylpyrrolidone, N-methylformamide, N,N-dimethylpropionamide, dimethylsulfoxide, hexamethylphosphoric triamide or tetramethylurea is used as the polar aprotic solvent.

6. A process as set forth in claim 1, wherein diethyl ketone, cyclohexanone, ethyl acetoacetate, propiophenone, or ethyl malonate is used as the compound containing at least one —$CH_2$— group which is activated by one or more carbonyl groups.

* * * * *

UNITED STATES PATENT AND TRADEMARK OFFICE
CERTIFICATE OF CORRECTION

PATENT NO. : 3,904,659
DATED : September 9, 1975
INVENTOR(S) : Karl-Heinz Bantel et al.

It is certified that error appears in the above-identified patent and that said Letters Patent are hereby corrected as shown below:

In Column 3, Line 66, delete "... 1,5-dinitroanthraquinone, about 10... " and substitute --... 1,5-dinitroanthraquinone, 3 to 5% of 1,8-dinitroanthraquinone, about 10... --

In Column 4, line 3 of Example 6, delete "... cyclopentanone 36.2 parts... " and substitute --... cyclopentanone. 36.2 parts... --

Signed and Sealed this

Ninth Day of November 1976

[SEAL]

Attest:

RUTH C. MASON
*Attesting Officer*

C. MARSHALL DANN
*Commissioner of Patents and Trademarks*